United States Patent
De Raemaeker

(10) Patent No.: US 12,478,921 B2
(45) Date of Patent: Nov. 25, 2025

(54) COMPRESSOR INSTALLATION

(71) Applicant: ATLAS COPCO AIRPOWER, NAAMLOZE VENNOOTSCHAP, Wilrijk (BE)

(72) Inventor: Pieter De Raemaeker, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 341 days.

(21) Appl. No.: 18/215,862

(22) Filed: Jun. 29, 2023

(65) Prior Publication Data
US 2024/0058747 A1    Feb. 22, 2024

(30) Foreign Application Priority Data

Aug. 22, 2022  (BE) .................................. 2022/5658

(51) Int. Cl.
| | | |
|---|---|---|
| *B01D 53/02* | (2006.01) | |
| *B01D 53/06* | (2006.01) | |
| *B01D 53/26* | (2006.01) | |

(52) U.S. Cl.
CPC ........... *B01D 53/261* (2013.01); *B01D 53/06* (2013.01); *B01D 2257/80* (2013.01); *B01D 2259/40086* (2013.01)

(58) Field of Classification Search
CPC .. B64C 27/04; B64D 13/00; F01P 5/06; F01P 5/10; F04D 25/08; F04F 5/16; F04F 5/46;
(Continued)

(56) References Cited

U.S. PATENT DOCUMENTS

| | | | | |
|---|---|---|---|---|
| 4,898,599 | A | * | 2/1990 | Settlemyer ........... B01D 53/261 95/126 |
| 5,087,178 | A | * | 2/1992 | Wells .................. F04C 29/0007 95/123 |

(Continued)

FOREIGN PATENT DOCUMENTS

| | | |
|---|---|---|
| WO | 2020183251 A1 | 9/2020 |
| WO | 2020217156 A1 | 10/2020 |
| WO | 2020250056 A1 | 12/2020 |

OTHER PUBLICATIONS

BE Search Report and Written Opinion in corresponding BE Application No. 202205658, dated Mar. 1, 2023.

(Continued)

*Primary Examiner* — Christopher P Jones
(74) *Attorney, Agent, or Firm* — BACON & THOMAS, PLLC

(57) ABSTRACT

Compressor installation with a compressor element, an outlet with an outlet line, and a dryer, that is provided with a drying section and a regeneration section. The drying section is provided with a first inlet and a first outlet. The first inlet is connected to the outlet line. The regeneration section is provided with a second inlet and a second outlet. A regeneration line (is provided between the second inlet and a first point of the outlet line. At the second outlet a return line connects the second outlet to a second point (on the outlet line downstream of the first point. A primary portion of a heat exchanger is incorporated in the return line. A secondary portion of the heat exchanger is incorporated in an oil circuit of the compressor element.

13 Claims, 1 Drawing Sheet

(58) Field of Classification Search
CPC ...... B01D 2257/80; B01D 2259/40086; B01D 53/06; B01D 53/261; F04B 39/02; F04B 39/064; F04B 39/16; F04B 41/06
See application file for complete search history.

(56) References Cited

U.S. PATENT DOCUMENTS

| | | | |
|---|---|---|---|
| 6,221,130 B1* | 4/2001 | Kolodziej | F04D 17/12 96/111 |
| 11,325,064 B2* | 5/2022 | Geerts | B01D 53/229 |
| 2007/0034080 A1* | 2/2007 | Van Hove | B01D 53/265 62/93 |
| 2018/0017061 A1* | 1/2018 | Able | F04C 29/0092 |
| 2022/0143550 A1* | 5/2022 | Van Nederkassel ... | B01D 53/06 |
| 2022/0161186 A1* | 5/2022 | Van Nederkassel ... | B01D 53/06 |

OTHER PUBLICATIONS

European Search Report cited in European Appln. No. EP23188167 dated Dec. 20, 2023.

\* cited by examiner

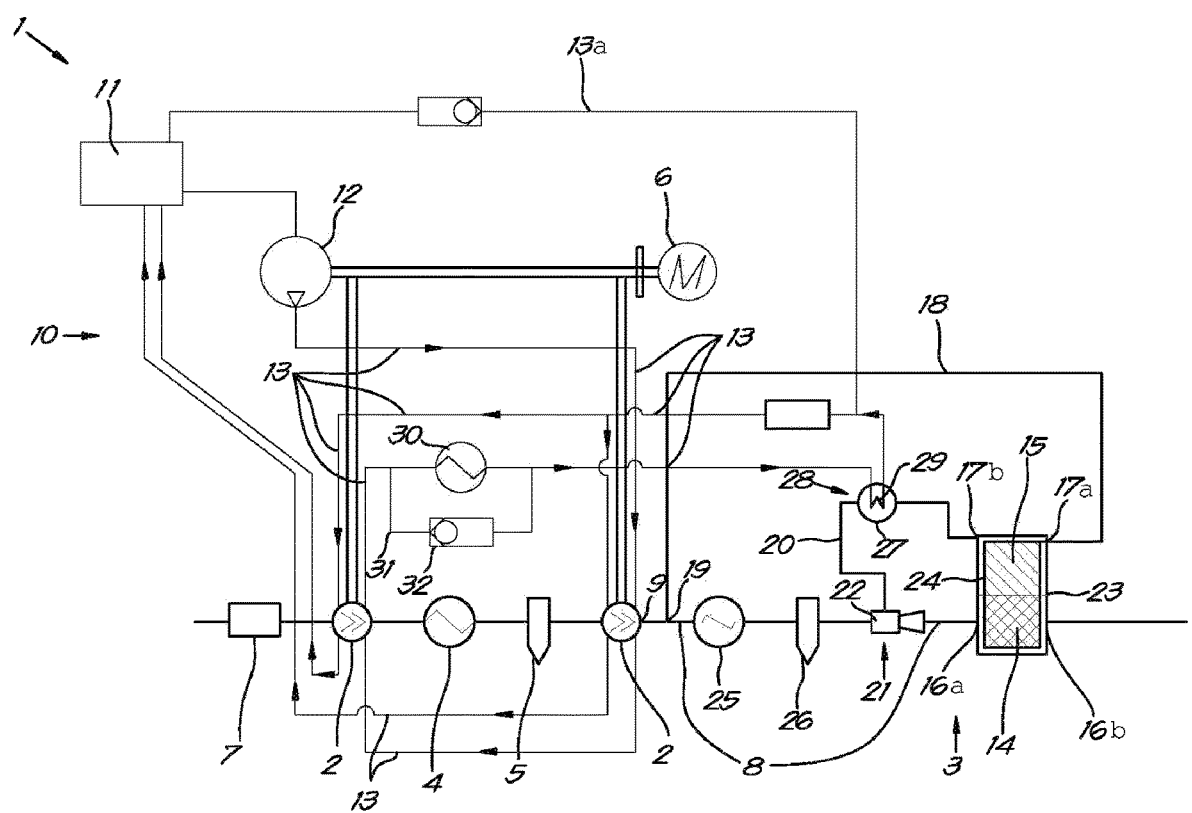

COMPRESSOR INSTALLATION

BACKGROUND OF THE INVENTION

The present invention relates to a compressor installation.

More specifically, the present invention relates to a compressor installation provided with at least one compressor element with associated oil circuit, which is provided with a dryer for drying the compressed gas, that is connected to an outlet line of the compressor element.

The oil circuit can be used only to lubricate, for example, the bearings of the compressor element and to cool the compressor element, but it can also be used to inject oil into the compressor element for lubrication and sealing.

This dryer is of the type that uses a drying agent or desiccant and is provided with a drying section and a regeneration section. The drying section has a first inlet for compressed gas to be dried and a first outlet for dried compressed gas, wherein the first inlet is connected to the outlet line for the supply of compressed gas to be dried. The regeneration section has a second inlet and a second outlet for regeneration gas. A regeneration line is provided between said second inlet and a first point of the outlet line for branching off a portion of the compressed gas to be dried, wherein said second outlet is connected to a return line connecting the second outlet to a second point on the outlet line downstream of said first point.

The regeneration line will branch off a part of the compressed gas to be dried and convey it to the regeneration section as a regeneration gas to regenerate the drying agent in this regeneration section.

After regeneration, the regeneration gas must be cooled before being returned to the compressed gas to be dried via the return line.

Therefore, a cooler is provided in this return line to cool the regeneration gas.

Such compressor devices are already known wherein said cooler is either air-cooled, i.e. an air-air cooler, or is water-cooled, i.e. a water-air cooler.

A disadvantage of an air-air cooler for cooling the regeneration air is that many conduits are required to get the regeneration air to the cooler section of the compressor device.

After all, for many air-cooled compressor installations, all or many of the coolers of the compressor installation, i.e. intercoolers, aftercoolers, oil coolers, . . . , are grouped at a location in the installation, called the cooling arrangement, where they are cooled with the ambient air by means of one or more fans.

The extra conduits ensure that the device becomes more extensive.

In addition, not only must an additional cooler be provided in this cooler arrangement, but in addition, in some cases, if the coolers are grouped in a cooler arrangement, this cooler of the regeneration gas is placed before the intercooler and aftercooler, such that the latter already receive partially heated ambient air and therefore must be dimensioned larger in order to achieve the same cooling.

A disadvantage of a water-air cooler for cooling the regeneration air is that one is dependent on a water supply that is provided by the user of the compressor device.

Therefore, it must be possible for the user to provide a sufficient amount of water at a sufficiently low temperature. If he cannot guarantee this possibility, the proper functioning of the compressor device cannot be guaranteed.

SUMMARY OF THE INVENTION

The present invention aims to provide a solution to said and other disadvantages.

The object of the present invention is a compressor installation provided with at least one compressor element with an associated oil circuit, wherein the compressor element is provided with an outlet with an outlet line connected thereto, wherein the compressor installation is further provided with a dryer for drying a compressed gas originating from the compressor element, wherein the dryer is of the type that uses a drying agent or desiccant, wherein the dryer is provided with a drying section and with a regeneration section, wherein the drying section is provided with a first inlet for compressed gas to be dried and a first outlet for dried compressed gas, wherein the first inlet is connected to said outlet line for the supply of compressed gas to be dried, wherein the regeneration section is provided with a second inlet and a second outlet for regeneration gas, wherein a regeneration line is provided between said second inlet and a first point of the outlet line for branching off a portion of the compressed gas to be dried, wherein at said second outlet a return line is connected that connects the second outlet to a second point on the outlet line downstream of said first point, characterized in that, in the return line, a primary portion of a heat exchanger is incorporated for cooling the regeneration gas, wherein the secondary portion of the heat exchanger is incorporated into the oil circuit of the compressor element.

Instead of using air or water to cool the regeneration gas, said heat exchanger will use another medium present in the compressor installation, namely the oil from the oil circuit.

In other words, the heat exchanger in the return line forms a cooler of the regeneration gas that is an oil-cooled cooler, or an oil-air cooler, instead of an air-cooled or water-cooled cooler.

An advantage is that such a compressor device will be more compact compared to an air-cooled compressor device wherein an additional air-air cooler must be provided together with the necessary conduits.

This is not the case for said heat exchanger, which can be incorporated into the oil circuit of the installation.

Moreover, in the case of an air-cooled compressor installation, where the coolers are grouped in a cooler arrangement, the coolers no longer have to be dimensioned larger.

Another advantage is that one is no longer dependent on a supply of cooling medium to be provided by the user, as is the case for a water-cooled cooler for the regeneration gas.

Yet another advantage is that a dryer with a heat exchanger in the return line that is cooled by water has the same construction as a dryer with a heat exchanger that is cooled by oil.

It is known that the regeneration air can be set up to 200° C., exposing the oil in the heat exchanger to this temperature.

Such a high temperature could adversely affect the life of the oil.

However, since the oil is continuously circulated in the oil circuit during operation, the oil will never reach this temperature.

In addition, the flow rates can be set up in such a way that the further components in the oil circuit are supplied with an oil with the correct temperature.

When the machine stops, the oil is no longer circulated while the gas in the heat exchanger will still have a high temperature.

However, this is not a problem, since the flash point and the auto-ignition temperature are higher than the temperature of the gas in the heat exchanger.

When using oil to cool the regeneration gas by means of the heat exchanger, which oil in turn is cooled, for example, by means of ambient air, it is never possible to cool as low or as deep as compared to the situation wherein the regeneration gas is cooled by ambient air using an air-cooled cooler. After all, the oil will never be able to be cooled to ambient temperature.

However, it appears that this fact will only have a limited impact on the operation of the dryer. The effect on the dew point of the dryer is of the order of 2° C.

One may also wonder whether the use of a heat exchanger with oil poses a risk of introducing oil into the compressed gas, something that must be avoided at all times with oil-free compressors.

But, at no time will this risk exist. In fact, there is less risk of oil getting into the compressed gas than of water getting into the compressed gas if water is used to cool the regeneration gas.

After all, during the operation, the maximum pressure of the oil in the oil circuit is always lower than the minimum operating pressure of the compressor device.

When the compressor device is stopped, the oil pump which controls the oil circuit, will also stop such that the pressure in the oil circuit will drop. Therefor, no oil can get into the compressed gas.

This is in contrast to the situation where the regeneration gas is cooled with water. Since this water is supplied by the user, the pressure of the water will not automatically stop when the compressor device is stopped. In other words: the pressure of the water is then higher than the pressure of the compressed gas, such that water leaks may occur.

In a practical embodiment, the oil circuit is provided with an oil reservoir and with an oil pump for circulating the oil from the oil reservoir, wherein the oil circuit is further provided with an oil line that runs from the oil reservoir to a cooling jacket of the compressor element, if present, then to the secondary portion of said heat exchanger, and then back to the oil reservoir.

Alternatively, the oil line can run from the oil reservoir to the secondary portion of said heat exchanger, then to the compressor element for its lubrication and then back to the oil reservoir.

In addition, the oil line from the oil reservoir can first run to a cooling jacket of the compressor element before it runs to the secondary portion of said heat exchanger.

Said heat exchanger is thus incorporated into each of said embodiments at a suitable location in the oil circuit. Moreover, this integration in the oil circuit does not entail an increase in the size of the compressor installation.

Preferably, a cooler is incorporated into the oil circuit for cooling the oil, wherein this cooler is incorporated into the oil line, upstream of the secondary portion of the heat exchanger in the oil circuit.

In this way, after optionally cooling the compressor element first, the oil will be cooled and have an optimum temperature for cooling the regeneration gas.

In an alternative embodiment, the compressor installation is provided with two compressor elements that are connected in series, wherein an intercooler is incorporated between the two compressor elements for cooling the compressed gas.

Said dryer itself can be embodied in different ways.

A first way is that the dryer is provided with a housing in which the drying section and the regeneration section are located, wherein a drum, containing the drying agent, is arranged in the housing, which drum is connected to driving means such that the drying agent can be moved successively through the drying section and the regeneration section.

A second way is that the dryer comprises a number of vessels filled with the drying agent, of which at least one vessel forms the drying section and at least one vessel forms the regeneration section, wherein the dryer further comprises a valve system connecting the outlet line, the regeneration pipe and optionally the return line to said vessels, wherein said valve system is such that at least one vessel is always being regenerated, while the other vessels dry the compressed gas, wherein by controlling the valve system the vessels are each in turn being regenerated.

BRIEF DESCRIPTION OF THE DRAWING

With the intention of better demonstrating the features of the invention, some embodiments of a compressor device according to the invention are described below, by way of example without any limiting character, with reference to the appended drawing, in which:

FIG. 1 schematically represents a compressor installation according to the invention.

DETAILED DESCRIPTION OF THE INVENTION

The compressor installation 1 of FIG. 1 mainly comprises two compressor elements 2 and a dryer 3 for drying a compressed gas, originating from the compressor.

According to the invention, the compressor installation 1 comprises at least one compressor element 2, and in the case of FIG. 1, two compressor elements 2.

FIG. 1 shows that, in this case, the compressor elements 2 are connected in series, wherein an intercooler 4 is incorporated between the two compressor elements 2 for cooling the compressed gas, and also a condensate separator or liquid separator 5 is provided.

One common drive 6 is provided for both compressor elements 2. Of course, the invention is not limited thereto.

Upstream of the compressor elements 2, an inlet filter 7 is provided and downstream of the compressor elements 2 an outlet line 8 is provided on the outlet 9 of the second, or last, compressor element 2.

The two compressor elements 2 have an associated oil circuit 10.

This oil circuit 10 comprises an oil reservoir 11 and an oil pump 12 for circulating the oil from the oil reservoir 11.

The oil pump 12 is driven by said drive 6.

The oil circuit 10 is further provided with an oil line 13, with which the oil is circulated in the compressor installation. This oil line 13 runs through the entire compressor installation 1.

The oil circuit 10 can be used for cooling the compressor elements 2 and, if necessary, can additionally be used to inject oil into the compressor elements 2 if it concerns oil-injected compressor elements 2 and, if necessary, can additionally be used to inject oil for the lubrication of bearings of the compressor elements 2.

Said dryer 3 of the compressor installation 1 is of the type that uses a drying agent or desiccant.

The dryer 3 is provided with a drying section 14 and with a regeneration section 15.

A compressed gas to be dried, originating from the compressor elements 2, is passed through the drying section 14 to dry this gas, wherein the desiccant will extract moisture from the compressed gas to be dried.

The regeneration section 15 contains saturated drying agent, that is regenerated by passing a regeneration gas through it, to extract moisture from the drying agent.

The drying section 14 is provided with a first inlet 16a for compressed gas to be dried and a first outlet 16b for dried compressed gas, wherein the first inlet 16a is connected to said outlet line 8 for the supply of compressed gas to be dried.

The regeneration section 15 is provided with a second inlet 17a and a second outlet 17b for regeneration gas, wherein a regeneration line 18 is provided between said second inlet 17a and a first point 19 of the outlet line 8 for branching off a portion of the compressed gas to be dried. This branched-off compressed gas to be dried is used as regeneration gas and is passed through the regeneration line 18 to the regeneration section 15. Although this is not the case in the example of FIG. 1, it is possible that an electric heater is incorporated into this regeneration line 18 for heating the regeneration gas.

A return line 20 for the regeneration gas is connected to said second outlet 17b, that connects the second outlet 17b to a second point 21 on the outlet line 8 downstream of said first point 19.

In order to return the regeneration gas to the compressed gas to be dried, a venturi ejector 22 is incorporated into the outlet line 8 at the location of said second point 21.

It is also possible to use a blower instead of a venturi ejector 22.

The practical implementation of the dryer 3 itself can be done in different ways.

In the example of FIG. 1, the dryer is provided with a housing 23 in which the drying section 14 and the regeneration section 15 are located, wherein a drum 24 is arranged in the housing 23, that contains the drying agent, which drum 24 is connected to driving means, not shown in the FIGURES, such that the drying agent can be successively moved through the drying section 14 and the regeneration section 15.

However, the invention is not limited to this embodiment of the dryer 3.

Another type of dryer 3 that can be used comprises a plurality of vessels filled with the drying agent, of which at least one vessel forms the drying section 14 and at least one vessel forms the regeneration section 15, wherein the drier 3 further comprises a valve system connecting the outlet line 8, the regeneration line 18 and optionally the return line 20 to said vessels, wherein said valve system is such that at least one vessel is always being regenerated, while the other vessels dry the compressed gas, wherein by controlling the valve system the vessels are each in turn being regenerated.

In the example shown, an aftercooler 25 is incorporated into the outlet line 8 between the first point 19 and the second point 21 for cooling the compressed gas and in this case also, but not necessarily, a liquid separator 26.

According to the invention, a primary portion 27 of a heat exchanger 28 is incorporated into the return line 20 for cooling the regeneration gas.

The secondary portion 29 of this heat exchanger 28 is incorporated into the oil circuit 10 of the compressor element 2.

This means that the oil from the oil circuit 10 of the compressor elements 2 is used in this heat exchanger 28 to cool the regeneration gas before it is added back to the compressed gas to be dried.

The construction of the oil circuit 10 in the example shown, is as follows.

The oil circuit 10 comprises an oil line 13.

This oil line 13 runs from the oil reservoir 11 to a cooling jacket of the compressor elements 2.

Subsequently, the oil line 13 runs to the secondary portion 29 of said heat exchanger 28 and then to the compressor elements 2 for their lubrication and then back to the oil reservoir 11.

The oil line 13 can hereby inject oil at certain components, for instance at the bearings, for the lubrication of these components, but the oil line 13 can optionally additionally or alternatively inject oil into the compressor element 2 itself.

Finally, in this case, the oil circuit 10 comprises an oil cooler 30 for cooling the oil, wherein this oil cooler 30 is incorporated into the oil line 13, upstream of the secondary portion 29 of the heat exchanger 28 in the oil circuit 10.

In order to control the cooling of the oil, a bypass line 31 is provided over the oil cooler 30, wherein a control valve 32 is provided to control the amount of oil passing through the oil cooler 30.

For the sake of completeness, it is hereby mentioned that said oil cooler 30, intercooler 4 and aftercooler 25 can be either air-cooled or water-cooled.

In this case, the oil circuit 10 also comprises an additional oil line 13a which connects to the oil line 13 downstream of the secondary portion 29 of the heat exchanger 28 and which runs to the oil reservoir 11.

Although in the example shown the oil line 13 and the oil circuit 10 comprise both the cooling jacket and the lubrication of the compressor elements 2, it is possible that one of the two is not present.

The operation of the compressor installation 1 is very simple and as follows.

Gas to be compressed is compressed in the known manner by means of the compressor elements 2, and after passing through the aftercooler 25, it is sent to the dryer 3, where it is dried in the drying section 14.

In the process, the desiccant will become saturated with moisture and will be regenerated.

To this end, part of the compressed gas to be dried is branched off as regeneration gas via the regeneration line 18 at the location of the first point 19. Note that this branched-off gas has therefore not yet passed through the aftercooler 25.

This regeneration gas is passed through the regeneration section 15 where it will extract moisture from the saturated drying agent.

After passing through the regeneration section 15, the regeneration gas is cooled via the heat exchanger 28, before being added back to the compressed gas to be dried and, after passing through the drying section 14, leaves the compressor installation 1 via the first outlet 16b.

During operation, the oil pump 12 will circulate the oil in the compressor installation 1, where the oil will first be used to cool the compressor elements 2.

The oil is then cooled in the oil cooler 30, after which the cooled oil is used to cool the regeneration gas in the heat exchanger 28.

Afterwards, the oil can be used to lubricate components of the compressor elements 2 and possibly to be injected into the compressor elements 2 themselves.

Afterwards, the oil is returned to the oil reservoir 11 via the oil line 13.

The present invention is by no means limited to the embodiments described by way of example and shown in the FIGURES, but a compressor installation according to the invention can be realized in all kinds of shapes and dimensions without departing from the scope of the invention.

What is claimed is:

1. A compressor installation comprising at least one compressor element with an associated oil circuit, wherein the compressor element is provided with an outlet with an outlet line connected thereto, wherein the compressor installation is further provided with a dryer for drying a compressed gas originating from the compressor element, wherein the dryer is of the type that uses a drying agent or desiccant, wherein the dryer is provided with a drying section and with a regeneration section, wherein the drying section is provided with a first inlet for compressed gas to be dried and a first outlet for dried compressed gas, wherein the first inlet is connected to said outlet line for the supply of compressed gas to be dried, wherein the regeneration section is provided with a second inlet and a second outlet for regeneration gas, wherein a regeneration line is provided between said second inlet and a first point of the outlet line for branching off a portion of the compressed gas to be dried, wherein at said second outlet a return line is connected that connects the second outlet to a second point on the outlet line downstream of said first point, wherein, in the return line, a primary portion of a heat exchanger is incorporated for cooling the regeneration gas, wherein a secondary portion of the heat exchanger is incorporated into the oil circuit of the compressor element.

2. The compressor installation according to claim 1, wherein the oil circuit is provided with an oil reservoir and with an oil pump for circulating the oil from the oil reservoir, wherein the oil circuit is further provided with an oil line that runs from the oil reservoir to a cooling jacket of the compressor element, then to the secondary portion of said heat exchanger and then back to the oil reservoir.

3. The compressor installation according to claim 1, wherein the oil circuit is provided with an oil reservoir and with an oil pump for circulating the oil from the oil reservoir, wherein the oil circuit is further provided with an oil line that runs from the oil reservoir to the secondary portion of said heat exchanger, then to the compressor element for its lubrication and then back to the oil reservoir.

4. The compressor installation according to claim 3, wherein the oil line runs from the oil reservoir first to a cooling jacket of the compressor element before it runs to the secondary portion of said heat exchanger.

5. The compressor installation according to claim 1, wherein an oil cooler is incorporated into the oil circuit for cooling the oil, wherein this oil cooler is incorporated into the oil line, upstream of the secondary portion of the heat exchanger of the oil circuit.

6. The compressor installation according to claim 5, wherein a bridging line is provided over the oil cooler.

7. The compressor installation according to claim 1, wherein an electric heater is incorporated into the regeneration line.

8. The compressor installation according to claim 1, wherein an aftercooler and optionally also a liquid separator is incorporated into the outlet line between the first point and the second point.

9. The compressor installation according to claim 1, wherein the dryer is provided with a housing in which the drying section and the regeneration section are located, wherein a drum, containing the drying agent, is arranged in the housing, which drum is connected to driving means such that the drying agent can be moved successively through the drying section and the regeneration section.

10. The compressor installation according to claim 1, wherein the dryer comprises a number of vessels filled with the drying agent, of which at least one vessel forms the drying section and at least one vessel forms the regeneration section, wherein the dryer further comprises a valve system connecting the outlet line, the regeneration line and optionally the return line to said vessels, wherein said valve system is such that at least one vessel is always being regenerated, while the other vessels dry the compressed gas, wherein by controlling the valve system the vessels are each in turn being regenerated.

11. The compressor installation according to claim 1, wherein a venturi ejector is incorporated into the outlet line at the location of said second point.

12. The compressor installation according to claim 1, wherein a blower is incorporated into the outlet line at the location of said second point.

13. The compressor installation according to claim 1, wherein the compressor installation is provided with two compressor elements that are connected in series, wherein an intercooler is incorporated between both compressor elements for cooling the compressed gas.

* * * * *